(No Model.) 7 Sheets—Sheet 1.

A. F. JONES.
MACHINE FOR WORKING HIDES OR SKINS.

No. 601,809. Patented Apr. 5, 1898.

WITNESSES
Matthew M. Blunt
J. Murphy

INVENTOR.
Albert F. Jones
by
Jno. H. Churchill
ATTY.

(No Model.) 7 Sheets—Sheet 2.
A. F. JONES.
MACHINE FOR WORKING HIDES OR SKINS.
No. 601,809. Patented Apr. 5, 1898.

WITNESSES.
Matthew M. Blunt
J. Murphy

INVENTOR.
Albert F. Jones
by Jas. H. Churchill
ATT'Y.

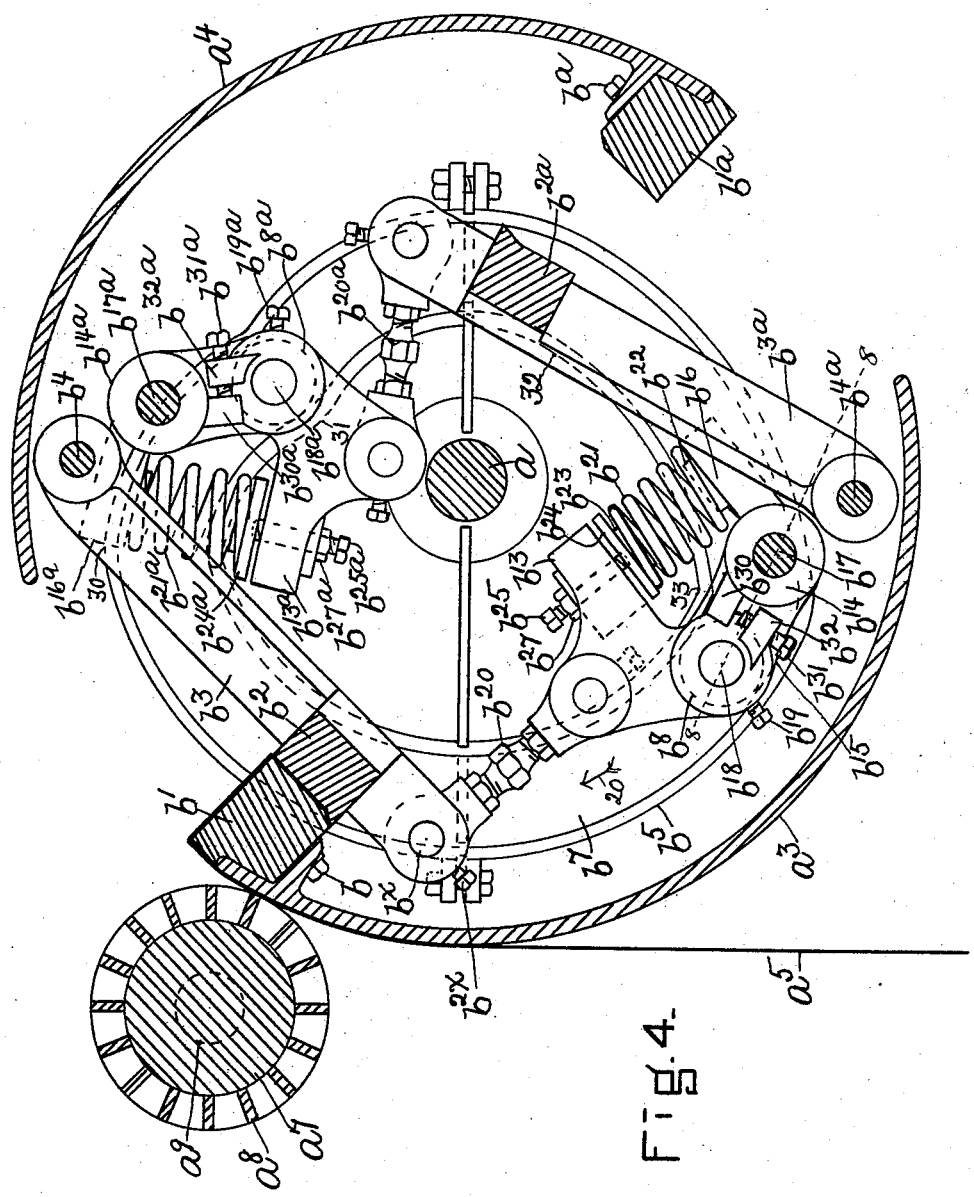

(No Model.) 7 Sheets—Sheet 4.

A. F. JONES.
MACHINE FOR WORKING HIDES OR SKINS.

No. 601,809. Patented Apr. 5, 1898.

WITNESSES.
Matthew M. Blunt
J. Murphy.

INVENTOR.
Albert F. Jones
By Jas. H. Churchill
ATT'Y.

(No Model.) 7 Sheets—Sheet 5.
A. F. JONES.
MACHINE FOR WORKING HIDES OR SKINS.
No. 601,809. Patented Apr. 5, 1898.
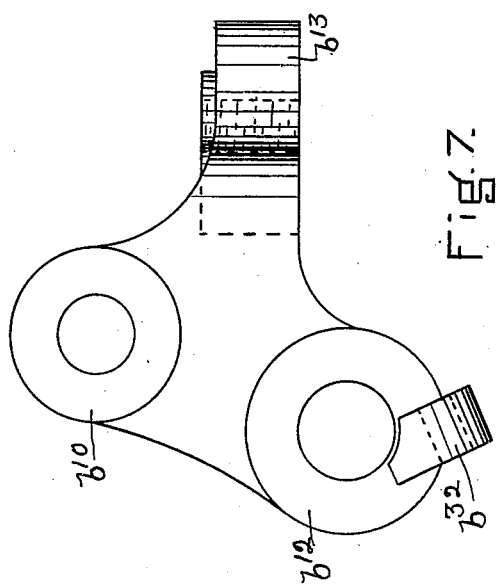
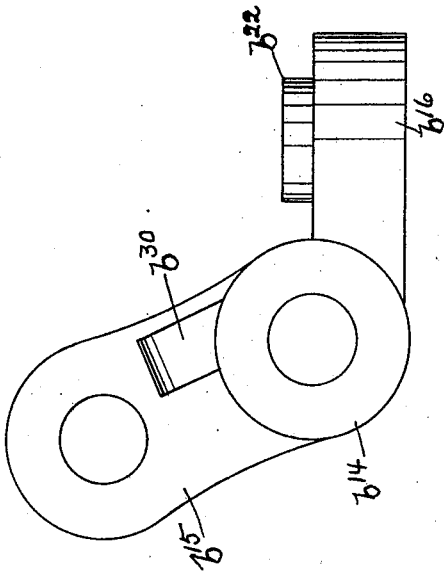
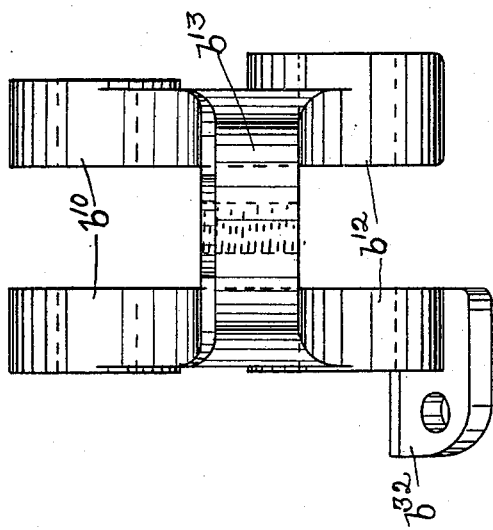
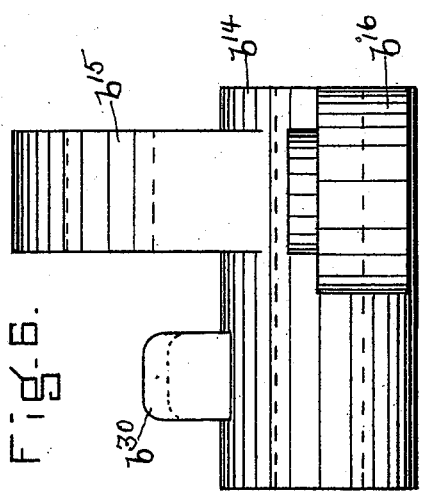
WITNESSES.
Matthew M. Blunt,
J. Murphy.
INVENTOR.
Albert F. Jones
by Jas. H. Churchill
ATTY (No Model.) 7 Sheets—Sheet 6.

A. F. JONES.
MACHINE FOR WORKING HIDES OR SKINS.

No. 601,809. Patented Apr. 5, 1898.

WITNESSES
Matthew M. Blunt
J. Murphy

INVENTOR
Albert F. Jones
by Jas. H. Churchill
ATT'Y.

(No Model.) 7 Sheets—Sheet 7.

A. F. JONES.
MACHINE FOR WORKING HIDES OR SKINS.

No. 601,809. Patented Apr. 5, 1898.

WITNESSES.
Matthew M. Blunt.
J. Murphy.

INVENTOR.
Albert F. Jones
by Jas. F. Churchill
ATT'Y.

UNITED STATES PATENT OFFICE.

ALBERT F. JONES, OF SALEM, MASSACHUSETTS, ASSIGNOR TO THE VAUGHN MACHINE COMPANY, OF PORTLAND, MAINE.

MACHINE FOR WORKING HIDES OR SKINS.

SPECIFICATION forming part of Letters Patent No. 601,809, dated April 5, 1898.

Application filed June 9, 1897. Serial No. 639,989. (No model.)

*To all whom it may concern:*

Be it known that I, ALBERT F. JONES, residing in Salem, in the county of Essex and State of Massachusetts, have invented an Improvement in Machines for Working Hides or Skins, (Case B,) of which the following description, in connection with the accompanying drawings, is a specification, like letters and figures on the drawings representing like parts.

This invention relates to a machine or apparatus for working hides or skins, and has for its object to provide a simple and efficient apparatus for the purpose specified.

In accordance with this present invention the machine is provided with a novel clamping mechanism for the hide or skin which is positively closed and opened by a cam and which is yet so constructed as will enable the clamping mechanism to adapt itself to hides or skins of different thicknesses, as will be described. These and other features of this invention will be pointed out in the claims at the end of this specification.

Figure 1:
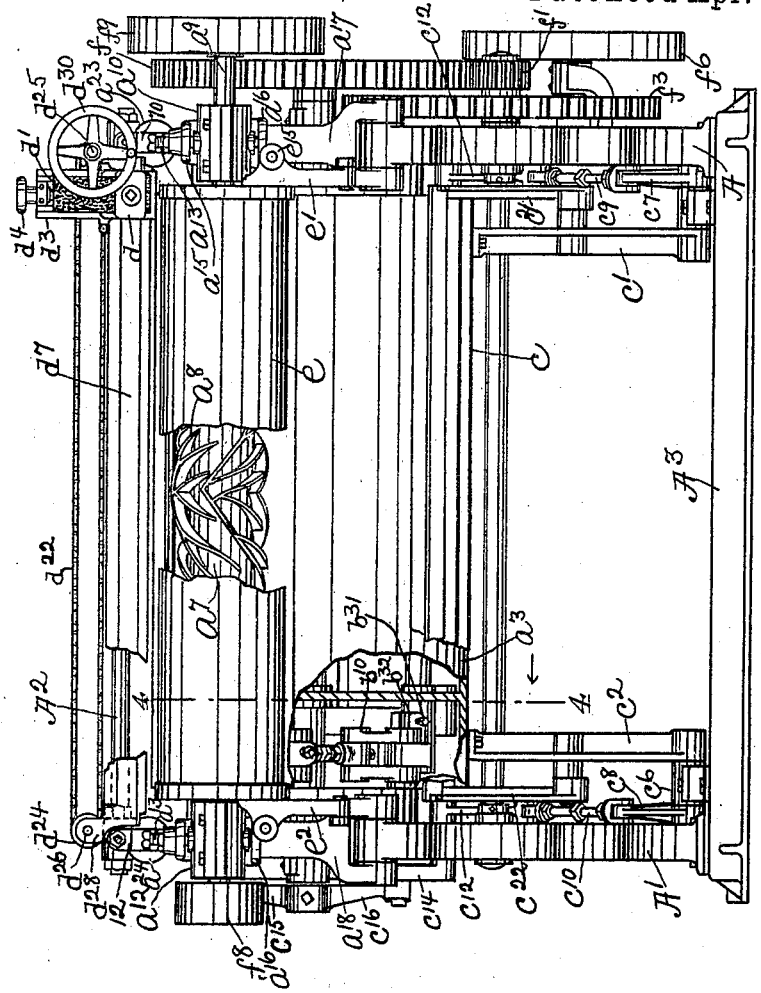
Figure 3:
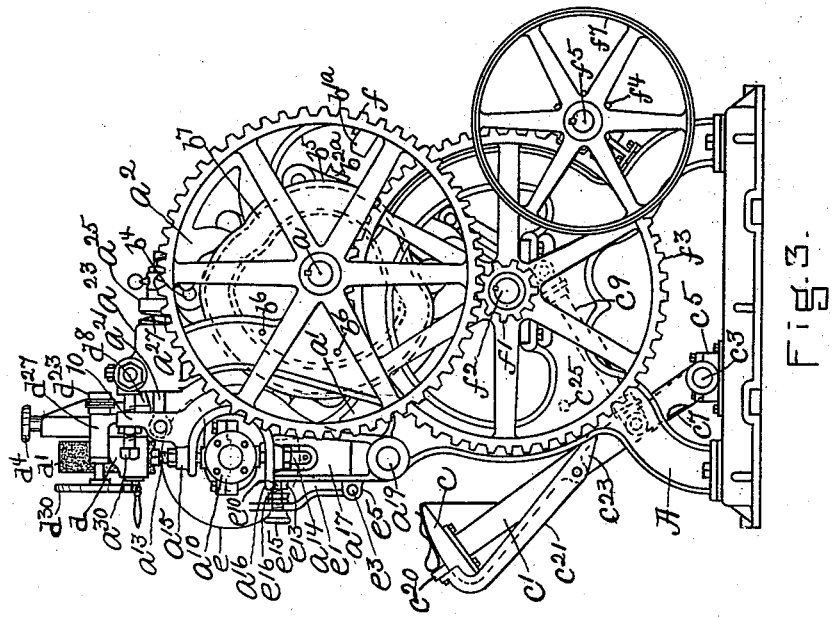
Figure 2:
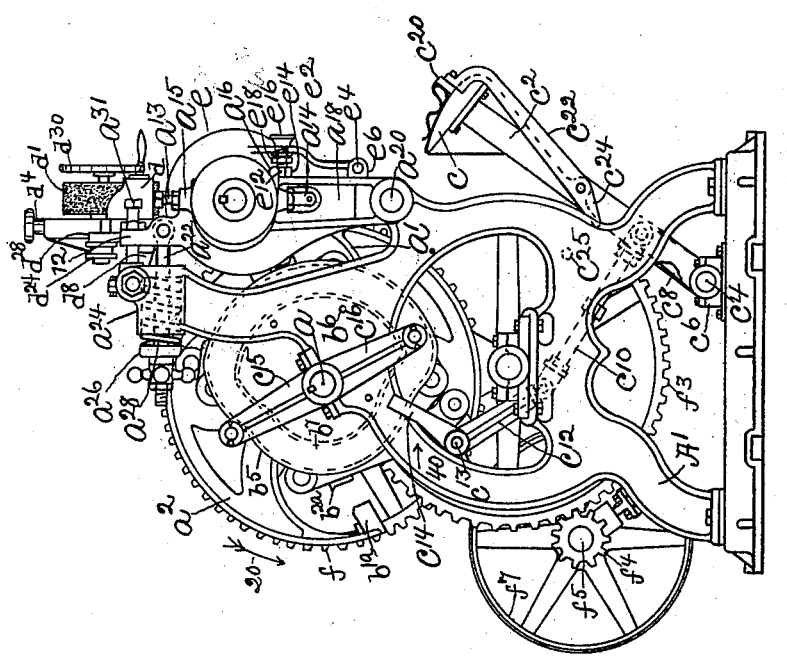
Figure 5:
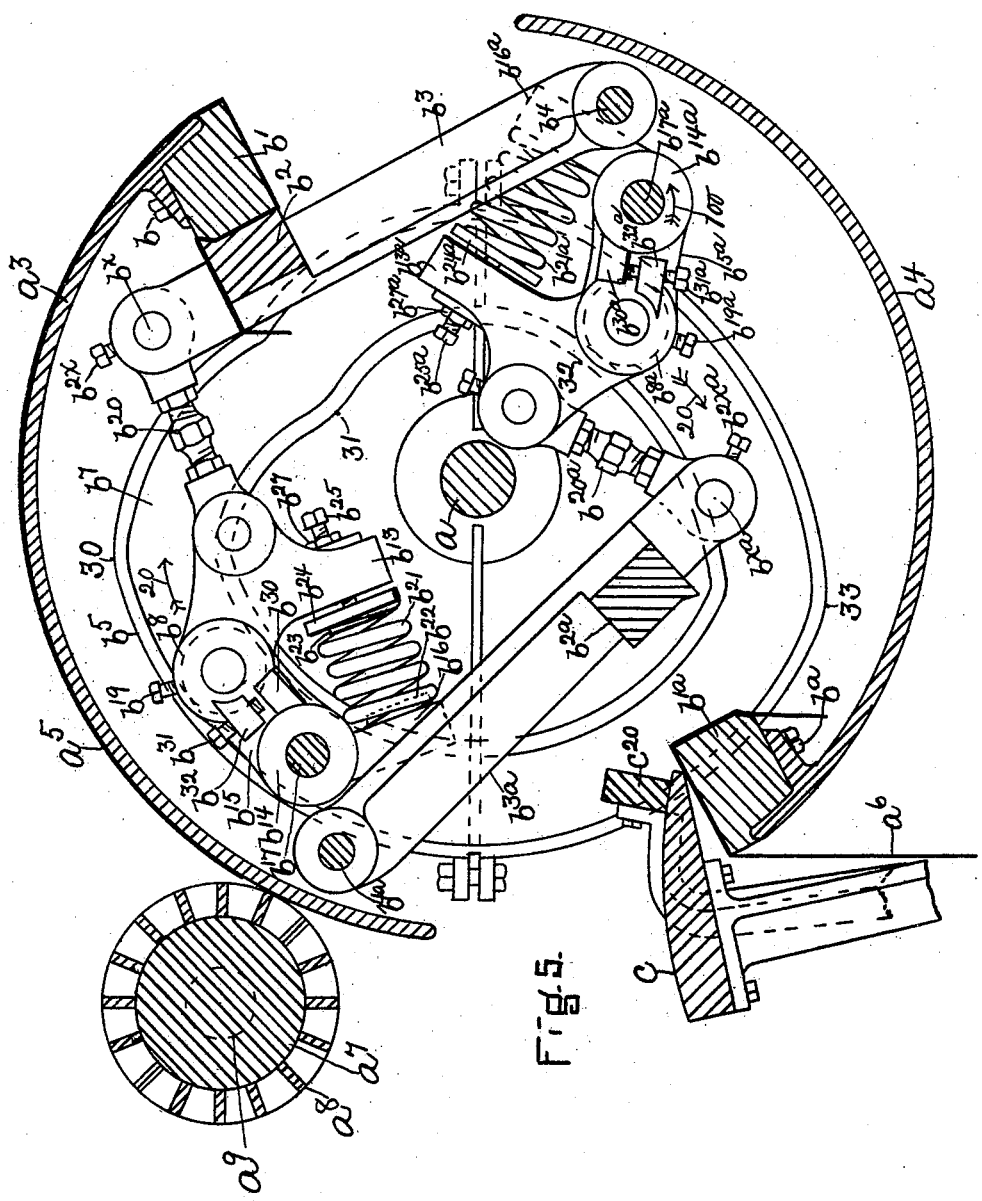
Figure 8:
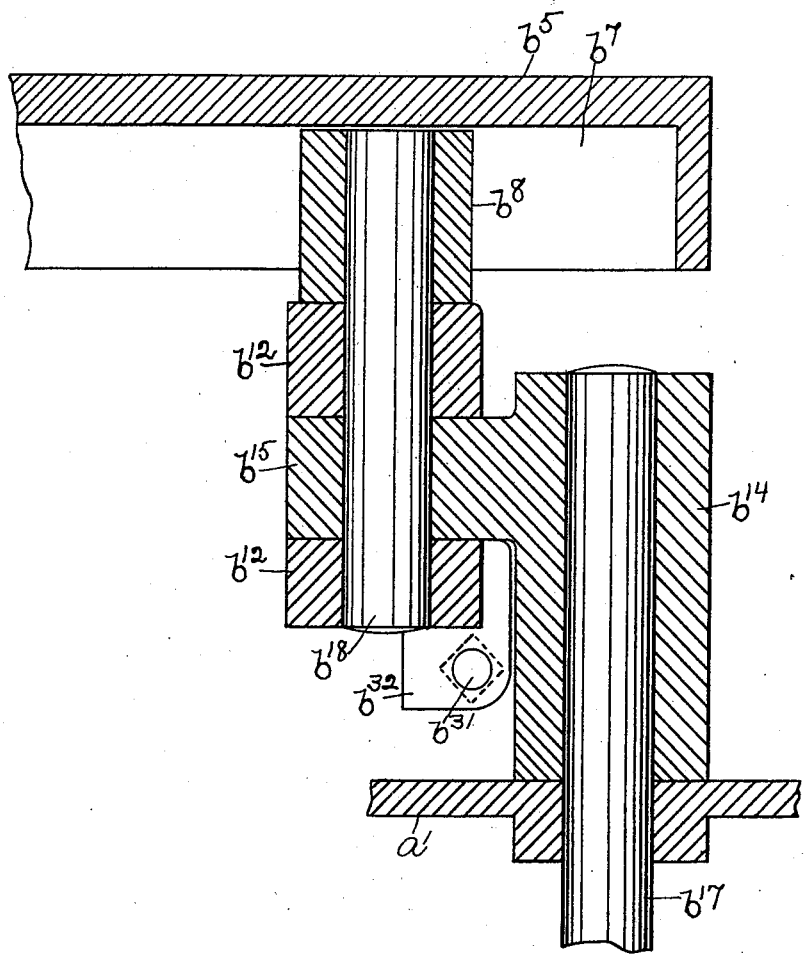
Figure 9:
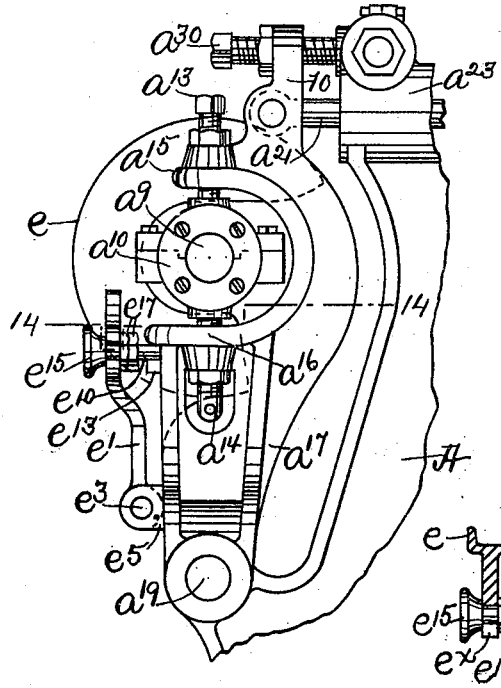
Figure 11:
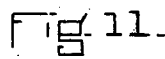
Figure 10:
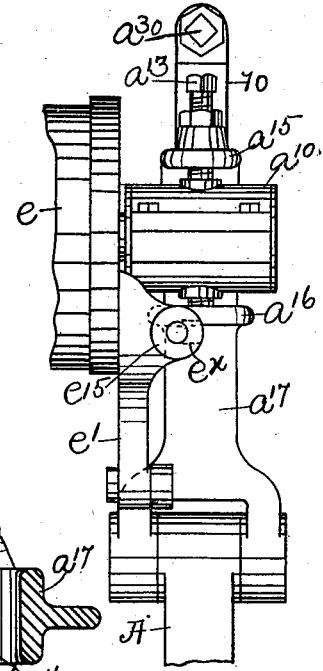

Figure 1 is a front elevation, with parts broken out, of a machine embodying this invention; Fig. 2, a side elevation of the machine shown in Fig. 1, looking toward the right; Fig. 3, a side elevation of the machine shown in Fig. 1, looking toward the left; Fig. 4, a sectional detail, on an enlarged scale, to more clearly show the clamping mechanism, the section being taken on the line 7 7, Fig. 1; Fig. 5, a sectional detail similar to Fig. 4, with the parts occupying a different position; Figs. 6 and 7, details on an enlarged scale, to be referred to; Fig. 8, a sectional detail, on an enlarged scale, taken on the line 11 11, Fig. 4, the shafts $b^{17}$ $b^{18}$ being shown in elevation; Fig. 9, a detail in side elevation and on an enlarged scale, to be referred to; Fig. 10, a front elevation of the parts shown in Fig. 9; Fig. 11, a sectional detail on the line 14 14, Fig. 9.

My present invention is herein shown as embodied in a machine containing features which form the subject-matter of another application, Serial No. 639,397, filed by me June 4, 1897.

The machine herein shown comprises a supporting-frame composed of the side pieces or uprights A A', connected together by a tie-bar $A^2$ and firmly secured to a suitable foundation $A^3$.

The side frames A A' support a drum-shaft $a$, to which is fastened, by radial arms $a'$ $a^2$, segments $a^3$ $a^4$ of a drum or cylinder. The segments $a^3$ $a^4$ constitute rotatable supports for the hides or skins $a^5$ $a^6$ to be acted upon by an operating roll or cylinder $a^7$, provided with blades or knives $a^8$.

The operating-roll $a^7$ has its shaft $a^9$ supported in journal-boxes $a^{10}$ $a^{12}$, pivotally supported by screws $a^{13}$ $a^{14}$ in forked or open arms $a^{15}$ $a^{16}$ of vertically-arranged levers $a^{17}$ $a^{18}$, pivoted at $a^{19}$ $a^{20}$ to the sides A A' of the frame. The pivot-screws $a^{13}$ $a^{14}$ enter suitable sockets in the top and bottom of the boxes $a^{10}$ $a^{12}$ to permit the operating-roll $a^7$ to move in a substantially horizontal plane, so that it may accommodate itself to the thick and thin portions of the hide. The roll-supporting levers $a^{17}$ $a^{18}$ are provided with extensions 10 12 to which are pivotally connected rods $a^{21}$ $a^{22}$, extended through cylinders $a^{23}$ $a^{24}$, attached to the side frames, the said rods being screw-threaded at their rear ends to be engaged by nuts $a^{25}$ $a^{26}$, against which bear one end of spiral springs $a^{27}$ $a^{28}$, which encircle the rods $a^{21}$ $a^{22}$ and bear against the heads of the cylinders $a^{23}$ $a^{24}$. The tension of the springs $a^{27}$ $a^{28}$ is regulated by the nuts $a^{25}$ $a^{26}$ to obtain the desired pressure of the operating-roll on the hide or skin passing under it. The springs $a^{27}$ $a^{28}$ keep the operating-roll in engagement with the hide or skin irrespective of the thickness of the said hide or skin, and the normal tendency of the springs is to move the operating-roll forward substantially into contact with the drum or work-supporting segments, and this forward movement is limited by adjustable stops, screws, or bolts $a^{30}$ $a^{31}$, which extend through the extensions of the levers $a^{17}$ $a^{18}$, and engage stationary parts of the machine.

The drum-segments $a^3$ $a^4$ have coöperating with them clamping mechanisms for the hides or skins $a^5$ $a^6$, which are of novel construction, as will now be described.

Referring to Figs. 4 and 5, the drum-segment $a^3$ has secured to it by bolts $b$ or in other suitable manner a stationary jaw $b'$, with which coöperates a movable jaw $b^2$, suitably fastened to levers $b^3$, pivoted on a shaft $b^4$, supported in the radial arm $a^2$ of the segment $a^4$. The lever $b^3$ is adapted to be moved toward and away from the fixed jaw $b'$ by cam plates or disks $b^5$, attached to the framework of the machine and represented in Figs. 2 and 3 as fastened to the side pieces or uprights A A' by bolts $b^6$. Each cam plate or disk $b^5$ is provided with a cam-groove $b^7$, in which travels a roller $b^8$, (see dotted lines, Figs. 4 and 5, and full lines, Fig. 8,) forming part of an actuating mechanism for the movable jaw $b^2$ of the clamp. The actuating mechanism referred to is preferably composed of two members or parts which are yieldingly connected together so as to move as one piece, but which yielding connection enables one of said parts to move independent of the other to permit the movable jaw $b^2$ to engage hides or skins of varying thickness, as will be more specifically described. The two members of the actuating mechanism are shown in Figs. 6 and 7 and one of which consists, essentially, of a yoke-shaped casting having two sets of arms $b^{10}$ $b^{12}$, joined by a tie bar or web $b^{13}$, and the other of which is a sleeve or hub $b^{14}$, provided with arms $b^{15}$ $b^{16}$. The sleeve $b^{14}$ is mounted on a stud or stationary shaft $b^{17}$, (see Figs. 4 and 8,) projecting from the radial arm $a'$ of the segment $a^3$, and has its arm $b^{15}$ extended between and pivotally connected to the forked arms $b^{12}$ by a pin $b^{18}$, (see Figs. 4 and 8,) to which the arm $b^{15}$ may be fastened by a set-screw $b^{19}$. The pin $b^{18}$ has mounted on it the cam-roller $b^8$. The forked arms $b^{10}$ have pivotally connected to them one end of an adjustable link $b^{20}$, having its other end pivotally connected to the free end of the lever $b^3$ by a pin $b^\times$, to which the link $b^{20}$ is fastened by a screw $b^{2\times}$. The arms $b^{16}$ $b^{13}$ have interposed between them a yielding medium shown as a spiral spring $b^{21}$, which in the present instance is shown as having one end encircling a boss $b^{22}$ on the arm $b^{16}$ and at its other end encircling a boss $b^{23}$ on a cap or plate $b^{24}$, which is engaged by the end of an adjusting-screw $b^{25}$, extended through a threaded opening in the arm $b^{13}$, and by means of which screw the tension of the spring $b^{21}$ may be regulated. The screw $b^{25}$ may be locked in its adjusted position by a nut $b^{27}$. The sleeve or hub $b^{14}$ may be provided also with a lug $b^{30}$, which coöperates with a screw $b^{31}$, extended through a lug $b^{32}$ on one of the arms $b^{12}$, for a purpose as will be described.

The drum-segment $a^4$ has coöperating with it a clamping mechanism of like construction and the parts of which are lettered the same as like parts of the clamping mechanism for the segment $a^3$, with the addition of the affix "a."

The operation of the clamping mechanisms may be briefly described as follows:

Referring to Fig. 4, the movable jaw $b^2$ is shown as closed and the hide or skin $a^5$ is clamped to the segment $a^3$ and is represented as being acted upon by the operating-roll. At the same time the movable jaw $b^{2a}$ is shown open, and the skin or hide $a^6$, which is shown as clamped to the segment $a^4$ in Fig. 5 and which is supposed to have been acted upon by the roll $a^7$, has dropped or been removed from the segment $a^4$ when the latter has traveled in the direction indicated by the arrow 20, Figs. 4 and 5, from the position shown in Fig. 5 to that shown in Fig. 4. In the rotation of the drum-segments the cam-rollers $b^8$ $b^{8a}$ travel in the cam-groove $b^7$, which is properly shaped to positively open and close the movable jaws $b^2$ $b^{2a}$, and in the present instance the portion of the cam-groove from the point 30 in Figs. 4 and 5 to the point 31 may be supposed to open the movable jaws, and the portion of the cam-groove from the point 31 to about the point 32 being on a true circle serves to hold the movable jaws open, while the portion of the cam-groove from the point 32 to the point 33 effects a gradual closing of the movable jaws, and the portion of the cam-groove from the point 33 to the point 30 being on a true circle serves to maintain the movable jaws closed.

In Fig. 4 the cam-roller $b^8$ is traveling in the portion of the groove from the point 33 to the point 30 and the jaw $b^2$ is closed, and the hide or skin $a^5$ is yieldingly clamped between the jaw $b^2$ and the jaw $b'$ by the spring $b^{21}$, for by inspection of Fig. 4 it will be seen that by reason of the cam-roller $b^8$ being in a true circular portion of the cam-groove $b^7$ the sleeve $b^{14}$ is held from turning, but that the forked part of the clamp-actuating mechanism, comprising the arms $b^{10}$ $b^{12}$, is free to turn on the pin $b^{18}$ against the action of the spring $b^{21}$ when the movable jaw $b^2$ engages the hide or skin $a^5$ and presses it against the fixed jaw.

In Fig. 4 the cam-roller $b^{8a}$ is shown at or about the point 31, and it will be seen that as the cam-roller $b^{8a}$ travels from the point 30 inward toward the center of the drum the sleeve $b^{14a}$ and its arm $b^{15a}$ are no longer locked from turning, and consequently the spring $b^{21a}$ being relieved from compression as soon as the roller $b^{8a}$ passes by the point 30 expands and forces the arms $b^{16a}$ $b^{13a}$ apart until the screw $b^{31a}$ and lug $b^{30a}$ are brought into engagement, as shown in Fig. 4, and when in this position the two parts of the clamp-actuating mechanism travel in the cam-groove as one piece until the cam-roller $b^{8a}$ reaches the point 33 of the large circular path or portion of the cam. As the cam-roller $b^{8a}$ travels in the portion of the cam-groove $b^7$ from the point 32 to the point 33 (see Fig. 5) the sleeve $b^{14a}$ is turned on its pivot in the direction indicated by the arrow 100, which movement is transmitted by the arm $b^{16a}$ and spring $b^{21a}$ to the arm $b^{13a}$, and as a result the screw $b^{31a}$ is maintained in engagement with the lug $b^{30a}$, and consequently the actuating mechanism as one piece is turned on the stud or pivot $b^{17a}$, thereby gradually straightening the link $b^{20a}$ and bringing it into substantially a straight line with the pivot $b^{17a}$ when the cam-roller $b^{8a}$ has reached the limit of its outward movement—namely, the point 33. When, however, the roller $b^{8a}$ reaches the limit of its outward movement and passes into the outer circular path, the union or connection of the two parts of the cam-actuating mechanism may be broken by the hide or skin between the jaws $b^{2a}$ $b'^{a}$ compressing the spring $b^{21a}$, and the movable jaw $b^{2a}$ is thus permitted to accommodate itself to hides or skins of different thickness. The action of the cam-groove $b^7$ upon the actuating mechanism for the jaw $b^2$ is the same as just described with relation to the jaw $b^{2a}$, and in Fig. 4 the cam-roller $b^8$ is shown in the outer circular portion of the cam and as having just passed the point 33. By reference to Fig. 4 it will be seen that the hide $a^5$ is clamped between the jaws $b^2$ $b'$ and that the jaw $b^2$ is held in engagement with the hide by the spring $b^{21}$. The jaw $b^2$ is held closed until the cam-roller $b^8$ passes the point 30 of the cam-groove, and when the said cam-roller reaches the point 30 the drum-segment will have advanced sufficiently to carry the hide $a^5$ past or beyond the operating-roll. After the cam-roller $b^8$ passes the point 30 in the cam-groove the jaw $b^2$ is opened as the roller $b^8$ travels from the point 30 to the point 31, thus permitting the ready removal of the skin or hide, the said jaw at such time being in the position occupied by the jaw $b^{2a}$ in Fig. 4. The jaw $b^2$ remains wide open while the roller $b^8$ travels on the circle from the point 31 to the point 32, and at such time the drum-segment $a^3$ will have advanced into the position occupied by the segment $a^4$ in Fig. 5 ready to receive the hide or skin, which may be placed within the drum between the jaws $b^2$ $b'$ by hand or by an automatic feed mechanism, as described in the application above referred to, and which consists of a feed-bar $c$, extended substantially the length of the drum-segments and secured to cranks or arms $c'$ $c^2$ on rock-shafts $c^3$ $c^4$, having bearings in boxes $c^5$ $c^6$, (see Fig. 1,) and provided at their opposite ends with cranks $c^7$ $c^8$, to which are joined links or bars $c^9$ $c^{10}$, the link $c^9$ being pivoted to the side frame A and the link $c^{10}$ being connected to an arm $c^{12}$ on a rock-shaft $c^{13}$, having bearings in the side frame A' and provided with a crank or arm $c^{14}$, adapted to be engaged by cranks or arms $c^{15}$ $c^{16}$ on the drum-shaft $a$ and shown in Fig. 2 as made in one piece. The feed-bar $c$ has coöperating with it a push-bar $c^{20}$, attached to levers $c^{21}$ $c^{22}$, pivoted to the cranks $c'$ $c^2$ and having arms $c^{23}$ $c^{24}$, which are adapted to engage studs or pins $c^{25}$ on the side frames A A', which studs turn the levers $c^{21}$ $c^{22}$ on their pivots and move the push-bar $c^{20}$ forward over the upper surface of the feed-bar $c$ and thereby push the hide or skin into the drum, as represented in Fig. 5. The feed-bar $c$ is moved forward twice during each revolution of the shaft $a$ by the cranks or arms $c^{15}$ $c^{16}$ engaging the crank or arm $c^{14}$ and moving it in the direction indicated by arrow 40, Fig. 2.

In leather-working-machines employing an operating-roll having blades it is desirable to keep the said blades in good operative condition, which may be accomplished by a grinding or sharpening mechanism, such as represented in Figs. 1, 2, and 3, and which consists of a brick $d'$, of emery, secured, as by a screw $d^2$, in a holder $d$, vertically adjustable by a screw $d^4$ on a carrier $d^3$, movable on a bar $d^7$ by a link chain $d^{22}$, passed about a sprocket-wheel $d^{23}$ and pulley $d^{24}$, the shaft $d^{25}$ of which is provided with a hand-wheel $d^{30}$, the bar $d^7$ being secured to arms $d^8$.

Another feature of this invention consists in a novel cover or hood $e$ for the operating-roll, which in accordance with this invention is made substantially semicircular in shape and provided at its ends with arms $e'$ $e^2$, pivoted, as at $e^3$ $e^4$, to lugs $e^5$ $e^6$ on the roll-supporting levers $a^{17}$ $a^{18}$. (See Fig. 9.) The cover or hood $e$ is adapted to be turned down on the pivots $e^3$ $e^4$, so as to permit of access to the operating-roll, and the said cover is locked in its raised or normal position by locking devices (shown as pins or rods $e^{10}$ $e^{12}$) pivoted to move in a horizontal plane on lugs $e^{13}$ $e^{14}$, attached to the levers $a^{17}$ $a^{18}$. (See Figs. 2, 3, 9, 10, and 11.) The rods or pins $e^{10}$ $e^{12}$ are adapted to enter slots $e^\times$ in the side of the arms $e'$ $e^2$, (see Figs. 9, 10, and 11,) and are provided with screw-heads or thumb-nuts $e^{15}$ $e^{16}$ to engage one face of the arms and with lock-nuts $e^{17}$ $e^{18}$ to engage the other face of said arms. By unscrewing the thumb-nuts $e^{15}$ $e^{16}$ the rods $e^{10}$ $e^{12}$ may be turned out of the slots $e^\times$ in the cover and the latter may be turned down, so as to uncover the roll $a^7$.

The drum-shaft $a$ may be rotated in any suitable manner, and in the present instance the said shaft has fast on it a gear $f$, in mesh with a pinion $f'$ on a shaft $f^2$, having mounted on it a gear $f^3$, which meshes with a pinion $f^4$ on a main shaft $f^5$, provided with a fast pulley $f^6$, which may be belted to a counter-shaft. (Not herein shown.) The operating-roll $a^7$ may be driven in any suitable manner, and as herein represented the said roll has fast on its shaft a pulley $f^8$, and, preferably, also a fly-wheel $f^9$. The pulley $f^8$ may be belted to the counter-shaft. (Not herein shown, but to which the pulley $f^6$ is connected.)

I claim—

1. In a machine for working hides and skins, the combination of the following instrumentalities, viz: a rotatable work-support, a clamping mechanism movable with said work-support and provided with a movable jaw pivoted within the said work-support off the center thereof and movable toward the center of said work-support in the act of opening, an actuating mechanism for said movable jaw, and a cam provided with a cam-groove which is engaged by said actuating mechanism and is constructed to open the jaw, to hold the same open to permit the hide to be placed in position, to gradually close said jaw on the hide, and to hold the jaw closed while the hide is being acted upon, substantially as described.

2. In a machine for working hides or skins, the combination of the following instrumentalities, viz: a rotatable work-support, a clamping mechanism coöperating therewith and provided with a movable jaw, a cam provided with a cam-groove, and an actuating mechanism for said movable jaw engaging said cam-groove and comprising two loosely-connected members having a yielding medium interposed between them, and means to limit the movement of said members by said yielding medium, substantially as described.

3. In a machine for working hides or skins, the combination of the following instrumentalities, viz: a rotatable work-support, a clamping mechanism coöperating therewith and provided with a movable jaw, a cam provided with a cam-groove, and an actuating mechanism for said movable jaw engaging said cam-groove and comprising two loosely-connected members, a spring interposed between said members, means to adjust the tension of said spring, and means to limit the movement of said members by said spring, substantially as described.

4. In a machine for working hides or skins, the combination of the following instrumentalities, viz: a rotatable segmental drum, a clamping mechanism coöperating therewith and provided with a movable jaw pivoted at one end within said drum and having its free end movable toward the center of the drum in the act of opening, an actuating mechanism positively connected to the free end of said jaw, and a cam having a cam-groove engaged by said actuating mechanism to positively move said jaw in opposite directions and thereby positively close and open said jaw, substantially as described.

5. In a machine for working hides or skins, the combination of the following instrumentalities, viz: a rotatable work-support, a clamping mechanism coöperating therewith and provided with a movable jaw, an actuating mechanism positively connected to said jaw and consisting of loosely-connected members having a yielding medium between them, means to limit the movement of said members by said yielding medium, and a cam positively engaged by said actuating mechanism to positively close and open the said movable jaw, substantially as described.

6. In a machine for working hides or skins, the combination of the following instrumentalities, viz: a segmental drum, a clamping mechanism coöperating therewith and comprising a stationary jaw, a movable jaw pivoted within said drum at one side of its center to move toward the center of the drum in the act of opening, a cam provided with a cam-groove, and an actuating mechanism for said movable jaw comprising two members loosely connected together and one of which is connected to the free end of the movable jaw, and a yielding medium between said members, substantially as described.

7. In a machine for working hides or skins, the combination of the following instrumentalities, viz: a movable work-support, an operating-roll coöperating therewith, supporting-levers for said roll, a hood or cover for said roll pivoted to said levers, and means to lock said cover in its operative position, substantially as described.

8. In a machine for working hides or skins, the combination of the following instrumentalities, viz: a rotatable work-support, a clamping mechanism coöperating therewith and provided with a movable jaw pivoted at one end within said work-support off the center thereof and having its free end movable toward the center of the work-support in the act of opening, a stationary cam provided with a cam-groove, and an actuating mechanism for said movable jaw positively connected to the free end of said jaw and engaging said cam to be actuated thereby to positively and pivotally open and close said movable jaw, substantially as described.

9. In a machine for working hides or skins, the combination of the following instrumentalities, viz: a rotatable work-support, a clamping mechanism coöperating therewith and provided with a movable jaw, an actuating mechanism connected to said jaw and comprising two members pivotally connected together and provided with arms, a yielding medium interposed between said arms, means on said members to limit their movement by said yielding medium, and a cam positively engaged by said actuating mechanism to positively close and open said movable jaw, substantially as described.

In testimony whereof I have signed my name to this specification in the presence of two subscribing witnesses.

ALBERT F. JONES.

Witnesses:
JAS. H. CHURCHILL,
J. MURPHY.